July 3, 1956 M. P. MIDDLEMARK 2753,557

INDOOR TELEVISION ANTENNAS

Filed Nov. 8, 1955

INVENTOR.
Marvin P. Middlemark
BY
A. Stephen Baker
ATTORNEY 2,753,557

INDOOR TELEVISION ANTENNAS

Marvin P. Middlemark, Forest Hills, N. Y.

Application November 8, 1955, Serial No. 545,607
3 Claims. (Cl. 343—805)

This invention relates to indoor television antennas of the type which are generally set on top of the television receiver cabinet and electrically connected to the receiver input terminals.

In metropolitan areas, it is generally considered that local stations are sufficiently powerful to obviate the necessity of a roof antenna which is generally large and disposed high in the air so as to be obstructed as little as possible by reflecting objects or buildings. In fact, even indoor antennas are very often excessively powerful in that they may overload the receiver or introduce reflected waves which may give rise to ghosts in the television picture.

It may further be noted that television antenna structures, on the whole, are considered to be an eye-sore. Both roof antennas and indoor antennas with extending dipole elements are aesthetically offensive to many people. However, it is almost universally recognized that not only is an antenna a necessity for television reception but, for all practical purposes, so are extending antenna elements which pick up the broadcast signals.

With the foregoing in mind, I have devised a television antenna which may take the form of a rectangular box or plate capable of pleasing ornamentation so that it is an artistic asset rather than a detriment to the beauty of a television receiver or to the room where it stands. This is not to imply that I am the first to provide a device coming within the general terms described. However, as far as I am aware, I am the first to effectively dispose elongated dipole antenna elements on such a supporting structure which elements may be folded so as to be concealed by the structure while at the same time serving as effective collectors of the broadcast signals in a variety of manners, including impedance matching, as will be described.

In a preferred use of my invention, I arrange elongated dipole elements so that they are folded behind the supporting structure and are thus concealed at the same time that they feed signal energy to the receiver. The elements are so arranged that they are then overlapped and parallel, the elements extending horizontally in opposite directions so as to most effectively pick up the conventional horizontally polarized waves employed in television transmission. The vertical spacing between the dipole elements is easily adjustable so as to vary the impedance of the antenna structure in accordance with the input impedance of the television receiver.

In addition to the above advantages, the dipole elements may be extended and disposed upwardly of its supporting structure and so as to assume various configurations, these expedients being adopted when a signal is not strong enough to be received by the concealed and folded elements. In other words, a weaker or a more distant station may require the dipole elements to be extended although in most cases their folded and concealed position will suffice.

The invention will be further understood from the following description and drawings in which.

In the form shown, the supporting structure 10 is rectangular, horizontally elongated, and in the shape of a box although it may simply be a front plate. The frame and front fabric are purely ornamental.

Figure 5:
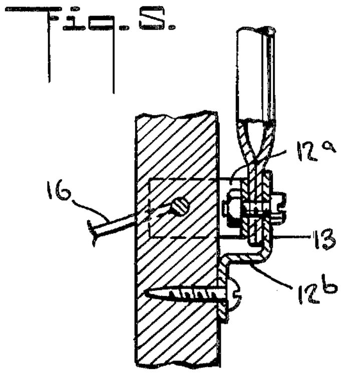
Figure 5 is an enlarged, cross-sectional view as taken along the line 5—5 of Figure 2.
Figure 2:
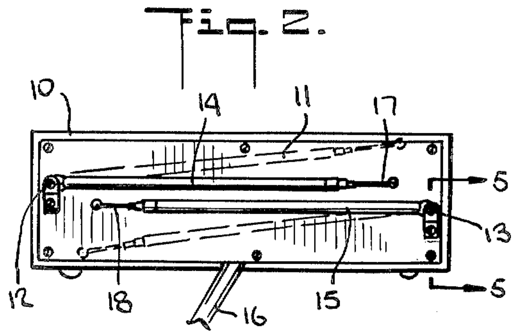
Figure 2 is a rear elevational view thereof.

Referring to Figure 2, the rear face 11 of the support 10 is provided with two pivots 12 and 13. The form of the pivots themselves is conventional and is adequately set forth in Figure 5. It will be observed that pivot 12 is on a higher vertical level than pivot 13. The reason therefore is to enable the dipole elements to be folded across the face of rear wall 11 and nevertheless be parallel to each other. Thus, elongated antenna or dipole elements 14 and 15 are connected to the pivots 12 and 13 respectively so that they may be each swung over an arc of considerably more than 180°.

Pivots 12 and 13 include metallic brackets **12*a* which serve as antenna terminals to which the twin conductors of conventional transmission line 16 are respectively connected so that the pivots are also the antenna terminals. With the inner terminal ends of the dipole elements 14 and 15 connected to the pivots, it will be observed that such inner terminal ends are not only horizontally spaced across substantially the whole width of the support 10, but are also vertically spaced as above set forth. Such vertical spacing of the pivots may be in the order of one inch or so. Holding brackets 12*b*** are also provided.

It will be observed in Figure 2 that the elements 14 and 15 may each be swung so as to be parallel to the horizontal or longitudinal axis of support 10 whereupon the elements will be extending in opposite directions relative to each other. The elements are enabled to swing to this position because there is no obstruction between the pivots which might hinder swinging action of either element, the elements being then disposed one directly above the other. Of course, the elements are then parallel to each other and the spacing between them will be approximately one inch as above set forth although such spacing is adjustable as will be described. The elements, although extensible, will generally be collapsed so that they do not extend laterally of the support 10 and are fully concealed although they are nevertheless in extended form so as to satisfy the requirements of an elongated antenna. The antenna, when thus arranged, will serve as an efficient collector of television signals in most localities in a metropolitan area.

It will be understood by those skilled in the art that the horizontal spacing between the folded and thus parallel elements 14 and 15 affects the impedance of the antenna just as does the spacing in any transmission line serving high frequencies. However, my arrangement enables the antenna elements to be further spaced apart while nevertheless retaining their parallel relationship. Thus, it will be noted in Figure 3 that element 14 may be swung upwardly so that its free end 17 is at the vertical height of the top of support 10. At the same time, element 15 may be downwardly swung until its free end 18 is at the vertical level of the floor of support 10. Nevertheless, the elements are still parallel although the spacing between them is more than double. Intermediate spacings are also possible. Such an arrangement is a very effective and simple way of adjusting the impedance of the antenna.

It will be obvious that in addition to the dipole element disposition shown in Figure 2, the elements may assume a variety of other dispositions as dictated by requirements. For example, in Figure 4 the elements are shown as both being vertical while the broken lines illustrate that they may assume divergent or crossed positions. The elements may further be telescopic and extensible as illustrated.

In order that the dipole elements serve their functions as set forth herein, their inner terminals, i. e., pivots 12 and 13, should be horizontally spaced from each other to a considerable degree. I have determined that for best results, the spacing should be at least nine inches. In a satisfactorily operating model, the spacing was fourteen inches.

Figure 1:
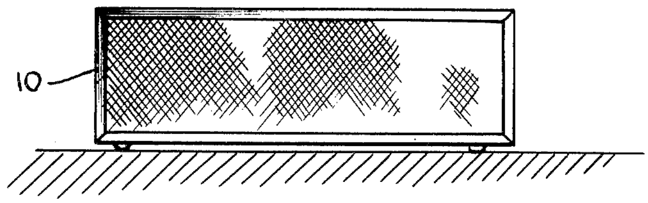
Figure 1 is a front elevational view of an indoor television antenna constructed according to my instant invention.
Figures 3, 4:
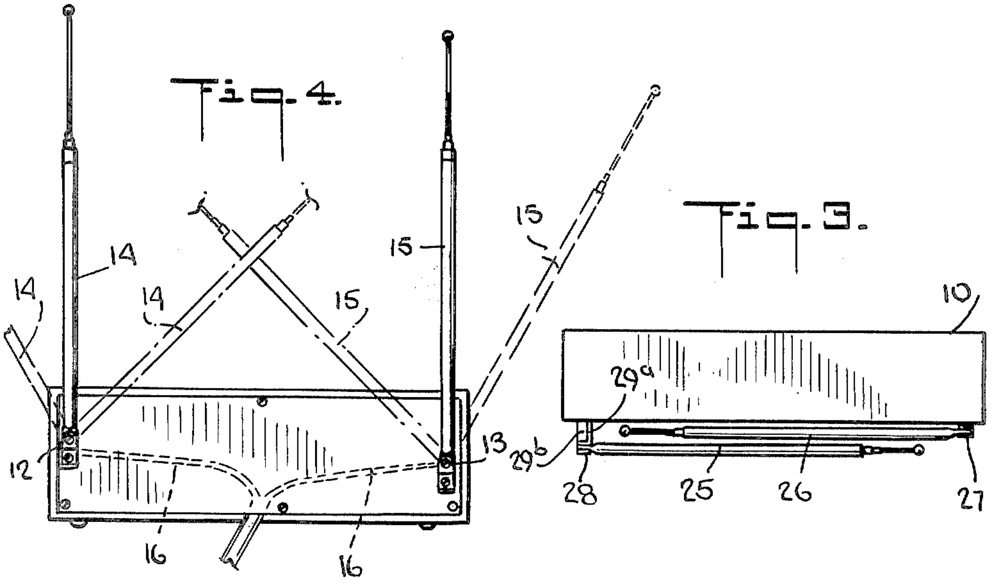
Figure 3 is a top elevational view of a modified embodiment.
Figure 4 is a rear elevational view showing various alternative dispositions of the dipole elements.

In Figure 3 is disclosed a modified embodiment wherein the dipole elements 25 and 26 correspond to dipole elements 14 and 15 of the first embodiment. Pivots 27 and 28 function as terminals as do the pivots 13 and 14. However, the metal brackets 29*a* and 29*b* of pivot 28, corresponding generally to the metal brackets 12*a* and 12*b*, extend further outwardly, e. g., ½″, than the corresponding metal brackets of pivot 27. Accordingly, the pivot 28 extends horizontally further outwardly than pivot 27. It will thus be recognized that when the dipole elements 25 and 26 are swung inwardly in overlapping relationship, the element 26 will be horizontally spaced from element 25 and that they may be disposed in the same horizontal plane in contrast to the disposition shown in the full lines of Figure 2. It will further be understood that the dipole elements of Figure 3 may likewise be adjusted as to vertical spacing in the same manner as illustrated in the broken lines of Figure 2.

In the embodiment of Figure 3, the pivots 27 and 28 are aligned at the same vertical level whereby the dipole elements are disposed in the same horizontal plane. However, it is evident that they may be vertically spaced as in the first embodiment although even in such first embodiment the pivots may also be aligned at the same vertical level while still retaining many of the benefits of this invention. Further, one of the pivots may be both higher and inward of the other pivot so that the dipole elements will be spaced both horizontally and vertically.

In either of the embodiments illustrated, the dipole elements, when in their desirably folded and concealed position, are not only parallel to each other but overlap each other substantially the full length of each element with their outer, free ends extending in opposite directions as illustrated in Figure 2. It has been determined that such arrangement, i. e., overlapping and extending in opposite directions has a most beneficial effect on the antenna gain.

In Figure 2, the pivots 12 and 13 are each disposed in respective horizontal planes, these planes being vertically spaced from each other. In Figure 3 the pivots 27 and 28 are each disposed in respective vertical planes, these planes being horizontally spaced from each other. In either case, the spacing of the planes permits the elements to swing toward each other to the positions shown in Figures 2 and 3 where they are horizontal, and overlap each other substantially the full length of each element while the disposition of the pivots permits the vertical spacing of the elements to be varied for impedance matching while the elements are maintained parallel.

The pivots have been illustrated as being rotatable in a vertical plane but it is evident that ball and socket joints or universal pivots may be employed so that the dipole elements are capable of universal orientation. It will further be evident that the structure may be oriented by simply rotating it bodily while it is on the receiver cabinet.

It is also understood that additional antenna elements in the form of metallic strips or the like may be connected in various configurations between the pivot terminals 12 and 13 and that a switch such as shown in my Patent Nos. 2,585,670 or 2,609,503, may also be employed.

There has been shown what is now considered a preferred embodiment of the invention but it is obvious that changes and omissions may be made without departing from its spirit.

What is claimed is:

1. A television antenna comprising a horizontally elongated supporting structure, a pair of elongated dipole elements connected to said supporting structure, inner terminals formed on said dipole elements and adapted to have the conductors of transmission line respectively connected thereto, pivots on the respective ends of said supporting structure and connecting said inner terminals thereto so that said dipole elements are swingable on said supporting structure, said pivots being disposed in respective planes which are spaced from each other whereby said elements may each swing in a vertical plane to a horizontal position where the elements are parallel to and overlap each other substantially the full length of each element and extend from their pivots toward each other, said elements being swingable substantially vertically away from each other on their respective pivots so as to uniformly vary the vertical spacing between them.

2. A television antenna comprising a horizontally elongated supporting structure, a pair of elongated dipole elements connected to said supporting structure, inner terminals formed on said dipole elements and adapted to have the conductors of transmission line respectively connected thereto, pivots on the respective ends of said supporting structure and connecting said inner terminals thereto so that said dipole elements are swingable on said supporting structure, one of said pivots being disposed vertically higher on said supporting structure than the other pivot whereby said elements may each swing to a horizontal position where they are parallel to and overlap each other substantially the full length of each element and extend from their pivots toward each other while being spaced to a degree equal to the vertical spacing of the pivots, the vertical spacing of the elements from each other being uniformly variable by swinging the elements vertically away from each other.

3. A television antenna comprising a horizontally elongated supporting structure, a pair of elongated dipole elements connected to said supporting structure, inner terminals formed on said dipole elements and adapted to have the conductors of transmission line respectively connected thereto, pivots on the respective ends of said supporting structure and connecting said inner terminals thereto so that said dipole elements are swingable on said supporting structure, one of said pivots being disposed horizontally outward of the other on said supporting structure whereby said elements may each swing to a horizontal position where they are parallel to each other in a horizontal plane and overlap each other substantially the full length of each element while being spaced horizontally to a degree equal to the horizontally outward spacing of the pivots, said elements being swingable vertically for varying the vertical spacing between them while maintaining them parallel.

References Cited in the file of this patent

UNITED STATES PATENTS

| | | |
|---|---|---|
| 2,431,124 | Kees et al. | Nov. 18, 1947 |
| 2,583,066 | Stiffel | Jan. 22, 1952 |
| 2,604,593 | Trowbridge | July 22, 1952 |